A. HOUGH.
PROCESS FOR SEPARATING NITROGLYCERIN FROM ACID MIXTURES CONTAINING THE SAME.
APPLICATION FILED OCT. 26, 1914.
1,202,065. Patented Oct. 24, 1916.
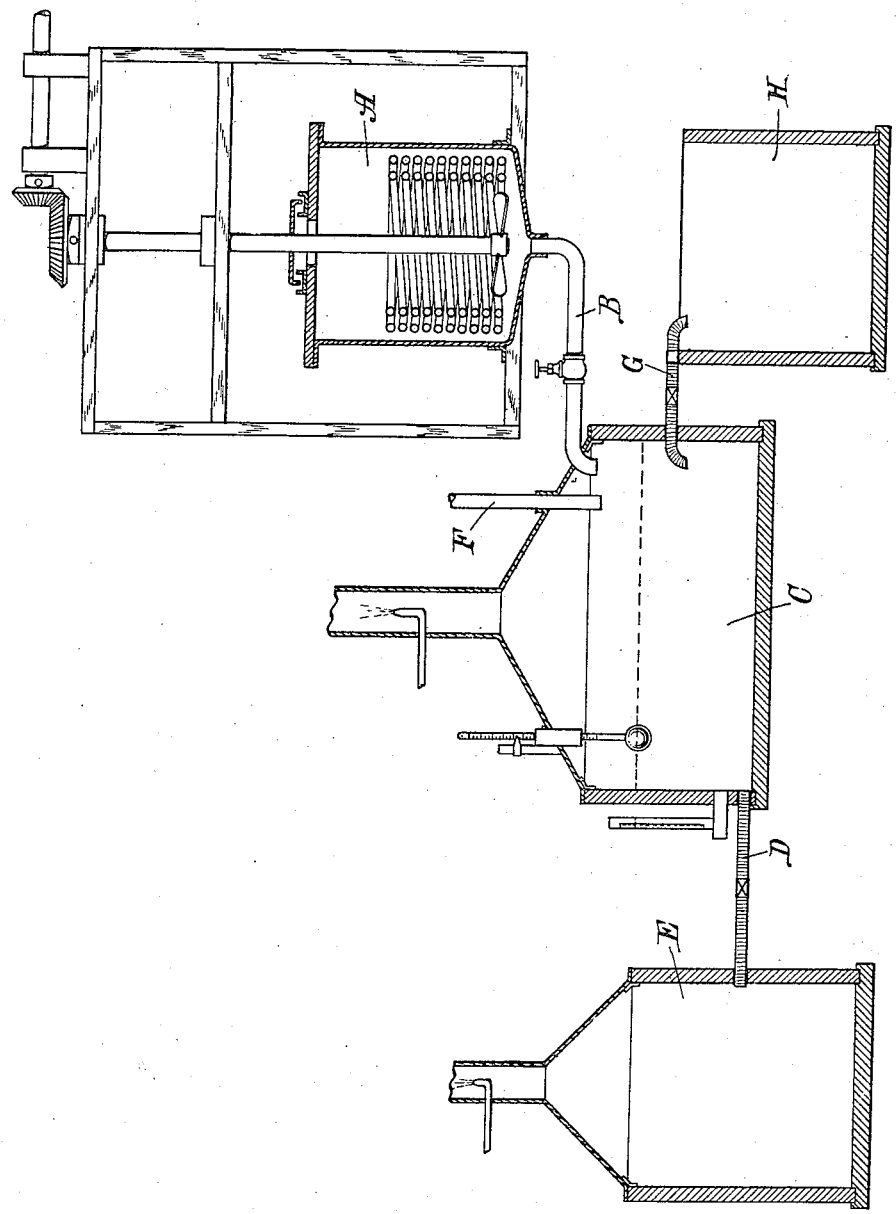
WITNESSES
INVENTOR
ARTHUR HOUGH
BY
ATTORNEYS

UNITED STATES PATENT OFFICE.

ARTHUR HOUGH, OF CHOISY, QUEBEC, CANADA.

PROCESS FOR SEPARATING NITROGLYCERIN FROM ACID MIXTURES CONTAINING THE SAME.

1,202,065.   Specification of Letters Patent.   Patented Oct. 24, 1916.

Application filed October 26, 1914.   Serial No. 868,596.

*To all whom it may concern:*

Be it known that I, ARTHUR HOUGH, a subject of the King of Great Britain, and a resident of Choisy, Province of Quebec, in the Dominion of Canada, have invented a new and Improved Process for Separating Nitroglycerin from Acid Mixtures Containing the Same, of which the following is a specification.

Practically speaking there exist today two processes for separating nitroglycerin from acid mixtures containing the same, one of which may be designated as an economic but dangerous process and the other as a safe but wasteful process. In both of these processes the nitration of glycerin takes place in a nitrator containing nitric and sulfuric acid, the nitric acid being relied upon to accomplish the nitration of the glycerin and the sulfuric acid to take up the water. When nitration is completed, if the operation proceeds according to what I call the dangerous process, its contents are dropped into a separator in which the nitroglycerin rises to the top and is thence withdrawn to a washing tank while the waste acids are withdrawn from the bottom of the separator whence they are introduced into a secondary separator where after standing for many hours a slight amount of nitroglycerin may be still further recovered. The waste or spent acids obtained from this separator are treated in such a manner as to decompose any traces of nitroglycerin present, to remove the nitric acid and to concentrate the sulfuric acid which process is common practice in the art of nitroglycerin manufacture. In the separator, along the line at which the force of specific gravity tends to separate the nitroglycerin from the waste acid there seems to be a constant tendency toward explosion. The nitroglycerin that has separated itself as the result of the force of specific gravity seems to be safe enough after it has once passed through the stage of separation, but along the lower line of the nitroglycerin and the upper line of the acid, flocculent matter may often be noticed and local decomposition is unavoidable, occurrences which, unless instantly controlled, result in the explosion of the entire separator. The dangers of this process have resulted in some instances in the use of what may be called a drowning process in which the contents of the nitrator are allowed to flow into a tank containing a large amount of water. It is commonly supposed that nitroglycerin is insoluble in water, and accordingly in this process the nitroglycerin settles at the bottom of the water tank and is withdrawn from there for further treatment. The difficulty with this process is that as a matter of fact, as commonly practised, the recovery of nitroglycerin is out of proportion with the theoretical yield that can be recovered by the so-called dangerous process above described. I have found that the loss due to the drowning process is to be ascribed to the fact that to a certain extent nitroglycerin is soluble in water and that consequently the water in the drowning tank after the contents of the nitrator are introduced, contains not only water and spent acids, but also a considerable amount of the nitroglycerin.

It is the object of the present invention to devise a process which shall be both safe and economical, avoiding the dangers and wastefulness of the two described processes and the simultaneous recovery of practically the entire theoretically expected yield.

According to my new process I prefer to start with a certain definite acid mixture which I prefer to employ for purposes of control. This acid mixture contains about 39% $HNO_3$, 61% $H_2SO_4$. When the nitration is complete, the nitroglycerin and the spent acids having now a composition approximately of 79% $H_2SO_4$, 8% $HNO_3$ and 13% $H_2O$ are introduced into a large drowning tank of cypress wood containing the desired quantity of water. A practical and desirable quantity of water may be in the ratio of 4 parts water to one part actual acids represented in the charge after nitration, for example a charge of 3,500 pounds of mixed acids and about 583 pounds of glycerin will result in 2,695 pounds of spent acids and 1,400 pounds of nitroglycerin, so that the most desirable quantity of water to start with in the drowning tank should be 2695×4=10780 pounds. I prefer this amount of water for the following reasons: If no cooling coils are used in the drowning tank, an excess of water, such as described, enables the operator to more easily control the temperature during the successive drowning of charges and the changes are not so marked as they would be if a smaller quantity of water were used. Charges from the nitrator are successively introduced into the drowning tank until such time as the desired composition in the tank is reached. The desired composition is such a one that the nitroglycerin from a further charge will no longer be soluble therein. In other words, at this point the liquid is what may be considered a saturated solution of nitroglycerin in a mixture of water, sulfuric acid and nitric acid. From this point on, a certain quantity of the liquid is run off from the drowning tank; this will be passed on to the acid recovery house. The nitroglycerin is thus precipitated to the bottom of the drowning tank and drawn off, to be subsequently treated in the usual manner. The acid composition of the drowning tank (and therefore the amount of nitroglycerin which is soluble in such composition or mixture) is preserved from this point on by the introduction with each succeeding charge from a nitrator of a quantity of water. When the desired composition in the drowning tank is reached, not only will the nitroglycerin from the nitrator pass through the liquid undissolved, but the nitroglycerin, or a part of it, previously dissolved with the acid and water mixture will be ejected as no longer soluble, so that at this moment it may happen that the recovery of nitroglycerin, which theoretically might be 2.46, may appear to be 3. Once this condition is reached in the drowning tank, the hydrometer reading is noted,—I have found it to be about 1.3 S. G.,—and with every fresh charge from the nitrator a fresh supply of water is added to the drowning tank, in this way preserving constantly that proportion of sulfuric acid, nitric acid and water in which the nitroglycerin is insoluble. As the drowning tank is filled by this constant addition of acid, nitroglycerin and water, a part of the liquid is withdrawn to lower the level thereof and from this liquid the acid contents are again recovered. The recovery of these acids since they contain no nitroglycerin is practically free from danger and although there is a very large amount of water to be eliminated, the additional fuel cost is relatively small.

In the drawing furnished herewith there is illustrated a nitrator A connected by means of the discharge pipe B with the separating tank C. The nitroglycerin is withdrawn through the pipe D at the lower part of the tank C connecting the tank C with the tank E. The water supply pipe is indicated as F and the acid withdrawal pipe and tank as G and H respectively. The hydrometer is indicated as I.

The essence of the invention will be found in the use of a drowning process in which the drowning liquid is brought to a condition where it will no longer act as a partial solvent for nitroglycerin, and that condition once brought about should be and can readily be preserved by the addition of a proportionate quantity of water as each new acid charge from the nitrator tends to increase the proportionate quantity of the acids in the drowning tank. The maintenance in the drowning tank of an acid mixture having a substantially constant proportionate constitution of nitric acid, sulfuric acid and water, the last two largely predominating, is, for commercial purposes, the key to an economic and safe separating process. As stated above, this condition can be approximately gaged by the hydrometer reading of 1.3 (1.24 to be strictly accurate), at which point the acid mixture shows a general proportion of 45 parts sulfuric acid, 50 parts water, 5 parts nitric acid. These latter figures are subject to considerable variation and are merely given to show the relatively small quantities of nitric acid with respect to the water contents of the liquid and the large proportion of sulfuric acid with respect to the water contents. The increases refer to weight.

Having described my invention what I claim is:

1. The process of separating nitroglycerin from acid mixtures in which the nitroglycerin was produced, which consists in introducing the entire body of said acid mixture and said nitroglycerin into a tank containing a large excess of acid mixture and water, the acid and water constituents of said mixture being so proportioned as to constitute a liquid which is saturated with nitroglycerin, and in maintaining said condition by the periodic addition of water with the introduction of each new volume of a body of nitroglycerin and acid.

2. The process of separating nitroglycerin from acid mixtures in which the nitroglycerin was produced, which consists in introducing the entire body of said acid mixture and said nitroglycerin into a tank containing a large excess of acid mixture and water, the acid and water constituents of said mixture being so proportioned as to constitute a liquid which is saturated with nitroglycerin, and in maintaining said condition by the periodic addition of water with the introduction of each new volume of a body of nitroglycerin and acid while withdrawing from the tank a suitable quantity of its liquid contents to maintain an approximately constant quantity in the tank.

3. The process of separating nitroglycerin from acid mixtures in which the nitroglycerin was produced, which consists in introducing the entire body of said acid mixture and said nitroglycerin into a tank containing a large excess of acid mixture and water, the acid and water constituents of said mixture being composed of sulfuric acid and nitric acid in the approximate proportion of 9 to 1 and water approximately twice the total acids of said mixture, having a specific gravity of approximately 1.3.

4. The process of separating nitroglycerin from the nitric and sulfuric mixtures with which the nitroglycerin was produced, which consists in the introduction of the entire body of said acid mixture and said nitroglycerin into a tank containing as its major constituent sulfuric acid mixed with a similar amount of water and approximately five per cent. of nitric acid, the said mixture being one which is saturated with nitroglycerin and withdrawing the separated nitroglycerin from the bottom of the tank.

5. The process of separating nitroglycerin from the nitric and sulfuric mixtures with which the nitroglycerin was produced, which consists in the introduction of the entire body of said acid mixture and said nitroglycerin into a tank containing as its major constituent sulfuric acid mixed with a similar amount of water and approximately five per cent. of nitric acid, the said mixture being one which is saturated with nitroglycerin, withdrawing the separated nitroglycerin from the bottom of the tank and a periodical withdrawing of a part of the liquid contents of said tank at a point above the level of the nitroglycerin and adding to said tank a quantity of water to compensate for the altered proportions created by the introduction of a fresh charge of nitroglycerin and acid.

6. The process of separating nitroglycerin from acid mixtures in which the nitroglycerin was produced, which consists in introducing the entire body of said acid mixture and said nitroglycerin into a tank containing a large excess of a saturated solution of nitroglycerin in a mixture of acid and water.

7. The process of separating nitroglycerin from acid mixtures in which the nitroglycerin was produced, which consists in introducing the entire body of said acid mixture and said nitroglycerin into a tank containing a large excess of a saturated solution of nitroglycerin in a mixture of acid and water and maintaining such condition by periodically adding water with the introduction of each new volume of nitroglycerin and acid.

8. The process of separating nitroglycerin from acid mixtures in which the nitroglycerin was produced, which consists in introducing the entire body of said acid mixture and said nitroglycerin into a tank containing a large excess of a mixture of acid and water, repeating this procedure until said mixture of acid and water has become a saturated solution of nitroglycerin, and then maintaining the saturated condition and the concentration of such solution by the subsequent periodic addition of water with the introduction of each new volume of a body of nitroglycerin and acid.

In testimony whereof I have hereunto set my hand in the presence of two subscribing witnesses.

ARTHUR HOUGH.

Witnesses:
FRED A. KLEIN,
JOHN A. FERGUSON.

Copies of this patent may be obtained for five cents each, by addressing the "Commissioner of Patents. Washington, D. C."